United States Patent
Hunt et al.

(10) Patent No.: US 9,972,472 B2
(45) Date of Patent: May 15, 2018

(54) WELDED SPIRAL GROOVE BEARING ASSEMBLY

(71) Applicant: General Electric Company, Schenectady, NY (US)

(72) Inventors: Ian Strider Hunt, Milwaukee, WI (US); Andrew Thomas Triscari, Milwaukee, WI (US)

(73) Assignee: General Electric Company, Schenectady, NY (US)

( * ) Notice: Subject to any disclaimer, the term of this patent is extended or adjusted under 35 U.S.C. 154(b) by 444 days.

(21) Appl. No.: 14/537,536

(22) Filed: Nov. 10, 2014

(65) Prior Publication Data

US 2016/0133431 A1 May 12, 2016

(51) Int. Cl.
*H01J 35/10* (2006.01)
*F16C 33/10* (2006.01)

(52) U.S. Cl.
CPC ............ *H01J 35/101* (2013.01); *F16C 33/10* (2013.01); *H01J 35/10* (2013.01); *H01J 35/105* (2013.01); *H01J 2235/106* (2013.01); *H01J 2235/1046* (2013.01); *H01J 2235/1086* (2013.01); *H01J 2235/1208* (2013.01)

(58) Field of Classification Search
CPC ......... H01J 35/10; H01J 35/101; H01J 35/105
USPC ................................................. 378/132, 133
See application file for complete search history.

(56) References Cited

U.S. PATENT DOCUMENTS

| | | | | |
|---|---|---|---|---|
| 4,641,332 A | * | 2/1987 | Gerkema | F16C 17/107 378/125 |
| 4,677,651 A | * | 6/1987 | Hartl | F16C 32/0402 378/132 |
| 4,949,368 A | * | 8/1990 | Kubo | H01J 35/101 378/132 |
| 5,077,775 A | * | 12/1991 | Vetter | H01J 35/101 378/130 |
| 5,181,235 A | * | 1/1993 | Ono | H01J 35/101 378/132 |
| 5,189,688 A | * | 2/1993 | Ono | H01J 35/101 378/132 |

(Continued)

FOREIGN PATENT DOCUMENTS

| | | |
|---|---|---|
| JP | 2000205246 A | 7/2000 |
| JP | 2003042143 A | 2/2003 |

(Continued)

OTHER PUBLICATIONS

International Search Report and Written Opinion for corresponding WO Appln. No. PCT/US2015/056835 dated Jan. 27, 2016, 12 pages.

*Primary Examiner* — Allen C. Ho
(74) *Attorney, Agent, or Firm* — Boyle Fredrickson, S.C.

(57) ABSTRACT

A structure and associated method for forming a liquid metal or spiral groove bearing assembly for an x-ray tube is illustrated that utilizes a unitary sleeve and a thrust ring or seal each formed of a weldable, non-refractory material. The sleeve and the thrust seal are welded to one another to provide an improved construction for minimizing leaks of the liquid metal bearing fluid. The structure of the sleeve and the thrust seal are formed with deformation restricting features that maintain the integrity of the bearing surfaces of the assembly when the thrust seal is secured within the sleeve and welded thereto to form the bearing assembly.

20 Claims, 4 Drawing Sheets

(56) References Cited

U.S. PATENT DOCUMENTS

| | | | | |
|---|---|---|---|---|
| 5,204,890 | A | 4/1993 | Anno et al. | |
| 5,210,781 | A * | 5/1993 | Ono | H01J 35/101 378/125 |
| 5,224,142 | A * | 6/1993 | Ono | H01J 35/101 378/127 |
| 5,260,983 | A * | 11/1993 | Ono | H01J 35/101 378/133 |
| 5,298,293 | A * | 3/1994 | Ono | F16C 17/107 427/256 |
| 5,384,818 | A * | 1/1995 | Ono | H01J 35/101 378/125 |
| 5,384,819 | A * | 1/1995 | Ono | F16C 17/026 378/132 |
| 5,416,820 | A * | 5/1995 | Weil | H01J 35/106 378/127 |
| 5,506,881 | A * | 4/1996 | Ono | H01J 35/101 378/132 |
| 5,583,906 | A * | 12/1996 | Sugiura | H01J 35/101 378/132 |
| 5,583,907 | A * | 12/1996 | Ono | H01J 35/101 378/132 |
| 5,602,898 | A * | 2/1997 | Vetter | F16C 17/107 378/132 |
| 5,701,336 | A * | 12/1997 | Jacob | H01J 35/101 378/125 |
| 5,809,106 | A * | 9/1998 | Kitade | H01J 35/101 378/117 |
| 6,064,719 | A * | 5/2000 | Vetter | F16C 23/04 378/125 |
| 6,215,852 | B1 * | 4/2001 | Rogers | H01J 35/105 378/141 |
| 6,275,567 | B1 * | 8/2001 | Hove | F16C 23/04 378/121 |
| 6,314,161 | B1 * | 11/2001 | Anno | H01J 35/101 378/125 |
| 6,379,040 | B1 * | 4/2002 | Hallman | A61B 6/035 193/4 |
| 6,430,261 | B1 * | 8/2002 | Bathe | H01J 35/103 378/132 |
| 6,445,770 | B1 * | 9/2002 | Wandke | H01J 35/101 378/132 |
| 6,449,339 | B2 * | 9/2002 | Yasutake | H01J 35/101 378/132 |
| 6,456,693 | B1 * | 9/2002 | Ratzmann | H01J 35/101 378/132 |
| 6,477,236 | B1 * | 11/2002 | Anno | H01J 35/105 378/127 |
| 6,480,571 | B1 * | 11/2002 | Andrews | H01J 35/101 378/131 |
| 6,632,118 | B2 * | 10/2003 | Jacob | B23K 20/12 228/112.1 |
| 6,707,882 | B2 * | 3/2004 | Bittner | H01J 35/101 378/130 |
| 6,735,281 | B2 * | 5/2004 | Higgins | H01J 35/26 378/127 |
| 7,561,669 | B2 * | 7/2009 | Thangamani | H01J 35/10 378/127 |
| 7,933,382 | B2 * | 4/2011 | Hunt | H01J 35/101 378/132 |
| 7,991,121 | B2 * | 8/2011 | Smith | H01J 35/10 378/121 |
| 7,995,708 | B2 * | 8/2011 | Andrews | H01J 35/101 378/131 |
| 8,009,806 | B2 * | 8/2011 | Legall | H01J 35/101 378/121 |
| 8,363,787 | B2 * | 1/2013 | Lathrop | H01J 35/101 378/132 |
| 8,410,650 | B2 * | 4/2013 | Jang | F16C 17/107 310/90 |
| 8,542,799 | B1 * | 9/2013 | Rogers | H01J 35/10 378/125 |
| 8,848,875 | B2 * | 9/2014 | Hunt | H01J 35/101 378/132 |
| 8,855,270 | B2 * | 10/2014 | Allen | H01J 35/101 378/132 |
| 8,897,420 | B1 * | 11/2014 | Hunt | H01J 35/24 378/125 |
| 9,305,739 | B2 * | 4/2016 | Legall | H01J 35/101 |
| 9,449,782 | B2 * | 9/2016 | Poquette | H01J 35/105 |
| 9,500,226 | B2 * | 11/2016 | Hunt | F16C 33/1065 |
| 9,607,801 | B2 * | 3/2017 | Poquette | H01J 35/101 |
| 2011/0050015 | A1 | 3/2011 | Jang et al. | |

FOREIGN PATENT DOCUMENTS

| | | |
|---|---|---|
| JP | 2006064041 A | 3/2006 |
| JP | 2006082105 A | 3/2006 |

\* cited by examiner

WELDED SPIRAL GROOVE BEARING ASSEMBLY

BACKGROUND OF THE INVENTION

The invention relates generally to x-ray tubes, and more particularly to structures and methods of assembly for the spiral groove bearing (SGB) utilized in an x-ray tube.

X-ray systems may include an x-ray tube, a detector, and a support structure for the x-ray tube and the detector. In operation, an imaging table, on which an object is positioned, may be located between the x-ray tube and the detector. The x-ray tube typically emits radiation, such as x-rays, toward the object. The radiation passes through the object on the imaging table and impinges on the detector. As radiation passes through the object, internal structures of the object cause spatial variances in the radiation received at the detector. The detector then emits data received, and the system translates the radiation variances into an image, which may be used to evaluate the internal structure of the object. The object may include, but is not limited to, a patient in a medical imaging procedure and an inanimate object as in for instance, a package in an x-ray scanner or computed tomography (CT) package scanner.

X-ray tubes include a cathode and an anode located within a high-vacuum environment. In many configurations, the anode structure is supported by a liquid metal bearing structure, e.g., a spiral groove bearing (SGB) structure, formed with a support shaft disposed within a sleeve or shell to which the anode is attached and that rotates around the support shaft. The spiral groove bearing structure also includes spiral or helical grooves on various surfaces of the sleeve or shell that serve to take up the radial and axial forces acting on the sleeve as it rotates around the support shaft.

Typically, an induction motor is employed to rotate the anode, the induction motor having a cylindrical rotor built into an axle formed at least partially of the sleeve that supports the anode target and an iron stator structure with copper windings that surrounds an elongated neck of the x-ray tube. The rotor of the rotating anode assembly is driven by the stator. The x-ray tube cathode provides a focused electron beam that is accelerated across an anode-to-cathode vacuum gap and produces x-rays upon impact with the anode. Because of the high temperatures generated when the electron beam strikes the target, it is necessary to rotate the anode assembly at high rotational speed. This places stringent demands on the bearings and the material forming the anode structure, i.e., the anode target and the shaft supporting the target.

Advantages of liquid metal bearings such as spiral groove bearings in x-ray tubes include a high load capability and a high heat transfer capability due to an increased amount of contact area. Other advantages include low acoustic noise operation as is commonly understood in the art. Gallium, indium, or tin alloys are typically used as the liquid metal in the bearing structure, as they tend to be liquid at room temperature and have adequately low vapor pressure, at operating temperatures, to meet the rigorous high vacuum requirements of an x-ray tube. However, liquid metals tend to be highly reactive and corrosive. Thus, a base metal that is resistant to such corrosion is desirable for the components that come into contact with the liquid metal bearing, such as the shaft of the anode assembly and is rotated for the purpose of distributing the heat generated at a focal spot.

As a result, the structure of the sleeve to which the anode is connected and the support shaft must be capable of withstanding the high temperatures and mechanical stresses created within the x-ray tube, as well as be able to withstand the corrosive effects of the liquid metal bearing. As such, a refractory metal such as molybdenum or tungsten is typically used as the base material for the construction of the sleeve or shell as well as for the other bearing components. Not only are such materials resistant to corrosion and high temperatures, but they tend to be vacuum-compatible and thus lend themselves to an x-ray tube application. In addition, cooling of the bearing structure can be effected by flowing a cooling fluid into the center of the support shaft to thermally contact the heat taken from the anode by the sleeve and liquid metal bearing fluid.

Due to the low weldability of materials of this type to one another, in order to construct the sleeve around the support shaft to form the bearing structure, it is necessary to join the components to one another to form robust compression seals between the components of the sleeve capable of withstanding the operating pressures (≤1000 psi) of the liquid metal within the sleeve. These compression seals are formed by bolts that join the various component parts of the sleeve to one another. In order to prevent leaks from occurring along paths formed between the parts of the compression seals, anti-wetting coatings are applied to the surfaces within the compression seals to stop the flow of the liquid metal through the seals.

However, as the refractory materials are difficult to machine, these surfaces are hard to manufacture without surface imperfections that enable leaks to occur in the seals. Also, due to the low galling/wear properties of the refractory materials, these surface imperfections, even if not present after machining, can occur during normal use of the tube resulting in the formation of fluid leaks, thereby shortening the useful life of the tube.

In an alternative construction for a liquid metal/spiral groove bearing structure, other metals, such as steel, can be utilized in place of the refractory metals for the construction of the sleeve and support shaft, such as disclosed in U.S. Pat. No. 6,477,236. While these other metals have a lower resistance to corrosion by the liquid metal fluid, they have the benefits of low cost compared to the refractory metals, good machinability, good galling/wear characteristics, and good weldability. As such, these metals can be more easily constructed and joined to form the bearing sleeve.

However, as a result of the decreased resistance to corrosion from the liquid metal bearing fluid, it is necessary to employ complex thermal barriers in the construction of the bearing structure to limit the heat reaching the structure and causing corrosion of the structure by the liquid metal bearing fluid.

In one attempt to overcome the issues with these known x-ray tube constructions, U.S. Pat. No. 5,701,336 discloses an x-ray tube in which the component parts of a bearing sleeve or shell are indirectly joined to one another by soldering. In this construction, the various components of the sleeve are formed of a refractory metal, such as molybdenum, tungsten or an alloy thereof, and are positioned in an abutting position against one another with the adjoining surfaces of each component including an anti-wetting coating. The sleeve components are secured in that configuration by a number of adjacent connecting elements disposed on the exterior surfaces of the sleeve components around the abutting surfaces. The connecting elements are formed of a material that can be readily welded, such that the connecting elements can be welded to one another, thereby forming a joint over the abutting ends of the adjacent sleeve components.

However, in this construction, the use of the refractory metals, e.g., molybdenum, for the sleeve components retains the aforementioned issues concerning the leaks formed in the gaps between the sleeve components. In particular, deformations in the abutting surfaces and/or gaps in the anti-wetting coatings allow the liquid metal bearing fluid to pass between the components and react with the material forming the connecting elements, thereby forming leaks in the tube structure. The deformations would also occur or be formed as a result of alteration of the configuration of the molybdenum material resulting from the weld tempera an applied to the connecting elements.

Another alternative construction for an x-ray tube to address these issues is disclosed in U.S. Pat. No. 5,204,890, in which a thrust ring or bottom fixed disk is joined to a lower end of a fixed cylinder, with ceramic coatings applied to the surfaces of the disk and the cylinder that are designed to come into contact with the liquid metal lubricant. Due to the position of the ceramic coatings, the base materials used to form the disk and the cylinder forming the sleeve can be metal with a relatively low resistance to the liquid metal bearing fluid, such as an iron alloy, e.g., stainless steel or carbon steel. In one disclosed embodiment, the bottom disk and the cylinder are joined to one another by soldering to construct the stationary inner portion of the bearing structure.

However, in this construction, due to the structure of the thrust bearing/disk and cylinder adjacent the soldering/welding points, the process of joining the components to one another deforms the material of the disk and cylinder around the connection point, which alters the necessary tolerances between the components allowing leak pathways to form for the liquid metal bearing fluid, while also heating the liquid metal fluid to a temperature where it can corrode the material forming the cylinder, disk and connection point. In addition, the thrust bearing gap is controlled by the length of the sleeve which is harder to machine, the thrust bearing does not contain liquid when tilted significantly due to its geometry; and the bearing structure design is limited in thrust bearing capability as the journal diameter must be increased to create a large enough thrust surface, simultaneously increasing friction drag.

As a result, it is desirable to develop a structure and method for the formation of a bearing structure for an x-ray tube that can be formed with a simplified structure using low cost materials in a manner that significantly limits deformation of the materials to minimize the formation of leaks in the structure.

BRIEF DESCRIPTION OF THE INVENTION

In the present invention a liquid metal or spiral groove bearing structure for an x-ray tube and associated process for manufacturing the bearing structure is comprised of a journal bearing shaft with a radially protruding thrust bearing flange encased in a two piece bearing housing or shell that is formed of low cost weldable materials, such as non-refractory metals, that are joined together to form the shell. The shell is formed with a thrust seal that is engaged with a single piece sleeve in a manner to maintain coaxiality for the rotating liquid metal seal formed in the shell about the shaft and to hold the thrust ring and sleeve in proper orientation for welding to one another. The shape of the sleeve and/or the thrust ring are configured to reduce and/or compensate for any deformation in the components of the shell, such as the cylindrical configuration of the sleeve, during the joining of the components to one another. With this construction, the close tolerances for the proper operation of the component parts of the bearing structure are maintained while minimizing the potential for leaks in the structure during operation.

The structure of the sleeve and thrust seal, as a result of being formed from a readily machined material, can also include a feature for napping and recirculating any liquid metal fluid moving past a thrust bearing portion of the bearing structure as well as for retaining excess liquid metal bearing fluid to optimize the operation of the bearing structure. The thrust seal can additionally be formed with structures for evacuating any gases formed during the welding process to avoid any loss of the liquid metal bearing fluid during assembly of the bearing structure into an x-ray tube.

In the method, after locating the shaft and liquid metal bearing fluid within in the sleeve, the thrust seal is positioned on and/or within one end of the sleeve, such as by shrink fitting the thrust seal into the end of the sleeve. Once located in the proper position with regard to the sleeve and shaft, the thrust seal is joined to the sleeve by forming a weld between the two components. The weld functions to effectively seal the leak path between the sleeve and the thrust seal without the need for any compression seals in the bearing structure. Also, any deformation in the structure of the thrust seal and/or the sleeve is compensated for by associated structures in the sleeve and thrust seal to maintain the integrity of the engagement of the sleeve and the seal by the weld.

In one exemplary embodiment of the invention, a bearing assembly is disclosed. The bearing assembly comprises a sleeve comprising a first welding feature thereon, a shaft rotatably disposed within the sleeve, a thrust seal seated at least partially within the sleeve, the thrust seal comprising a central aperture through which the shaft extends and a second welding feature thereon, and a weld joining the first weld feature and the second weld feature to one another. In at least one embodiment, the bearing assembly is adapted for use with an x-ray tube.

In another exemplary embodiment of the invention, an x-ray tube is disclosed. The x-ray tube comprises a frame defining an enclosure, a cathode assembly disposed in the enclosure an anode assembly disposed in the enclosure spaced from the cathode assembly, wherein the anode assembly has a sleeve formed of a first material and comprising a first welding feature thereon, a shaft rotatably disposed within the sleeve, a thrust seal seated at least partially within the sleeve, the thrust seal comprising a central aperture through which the shaft extends and a second welding feature thereon, a weld joining the first weld feature and the second weld feature to one another, and an target operably connected to the sleeve.

In an exemplary embodiment of the method of the invention, the method comprises the steps of providing a sleeve formed of a non-refractory material comprising a cap portion forming a closed end of the sleeve and a seating portion joined to the cap portion and forming an open end of the sleeve, placing an amount of a liquid metal bearing fluid into the cap portion of the sleeve, inserting a shaft into the cap portion of the sleeve, securing a thrust seal in the seating portion of the sleeve around the shaft and welding the seating portion of the sleeve and the thrust seal to one another.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description.

Furthermore, the claimed subject matter is not limited to implementations that solve any disadvantages noted above or in any part of this disclosure.

DETAILED DESCRIPTION OF THE INVENTION

Figure 1:
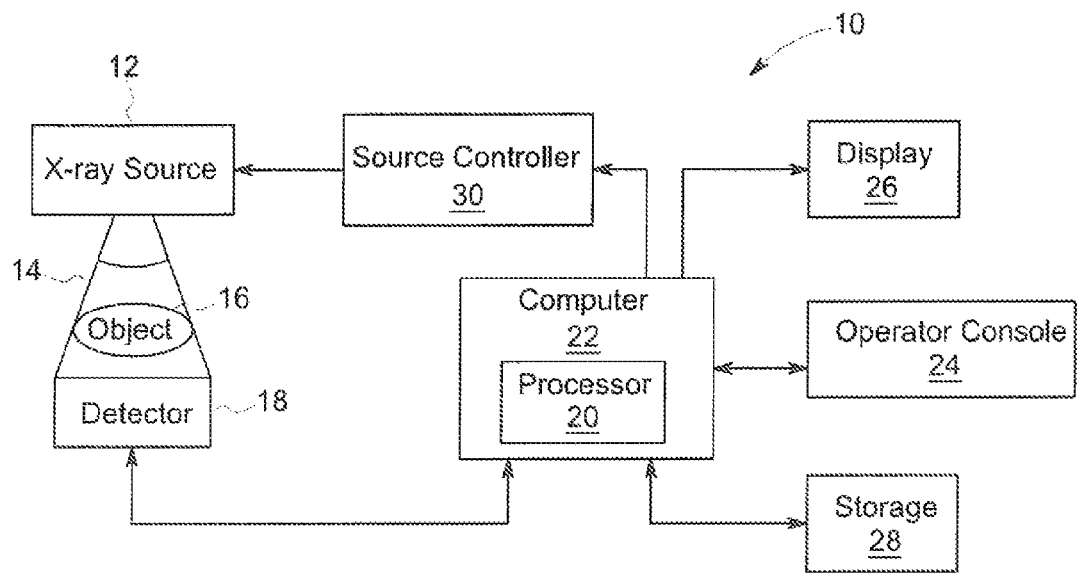
FIG. 1 is a block diagram of an imaging system incorporating exemplary embodiments of the invention.

FIG. 1 is a block diagram of an embodiment of an imaging system 10 designed both to acquire original image data and to process the image data for display and/or analysis in accordance with embodiments of the invention. It will be appreciated by those skilled in the art that various embodiments of the invention are applicable to numerous medical imaging systems implementing an x-ray tube, such as x-ray or mammography systems. Other imaging systems such as computed tomography (CT) systems and digital, radiography (RAD) systems, which acquire image three dimensional data for a volume, also benefit from the invention. The following discussion of x-ray imaging system 10 is merely an example of one such implementation and is not intended to be limiting in terms of modality.

As shown in FIG. 1, x-ray imaging system 10 includes an x-ray tube or source 12 configured to project a beam of x-rays 14 through an object 16. Object 16 may include a human subject, pieces of baggage, or other objects desired to be scanned. X-ray source 12 may be conventional x-ray tubes producing x-rays 14 having a spectrum of energies that range, typically, from thirty (30) keV to two hundred (200) keV. The x-rays 14 pass through object 16 and, after being attenuated, impinge upon a detector assembly 18. Each detector module in detector assembly 18 produces an analog electrical signal that represents the intensity of an impinging x-ray beam, and hence the attenuated beam, as it passes through the object 6. In one embodiment, detector assembly 18 is a scintillation based detector assembly, however, it is also envisioned that direct-conversion type detectors (e.g., CZT detectors, etc.) may also be implemented.

A processor 20 receives the signals from the detector assembly 18 and generates an image corresponding to the object 16 being scanned. A computer 22 communicates with processor 20 to enable an operator, using, operator console 24, to control the scanning parameters and to view the generated image. That is, operator console 24 includes some form of operator interface, such as a keyboard, mouse, voice activated controller, or any other suitable input apparatus that allows an operator to control the x-ray imaging system 10 and view the reconstructed image or other data from computer 22 on a display unit 26. Additionally, operator console 24 allows an operator to store the generated image in a storage device 28 which may include hard drives, floppy discs, compact discs, etc. The operator may also use operator console 24 to provide commands and instructions to computer 22 for controlling a source controller 30 that provides power and timing signals to x-ray source 12.

Figure 2:
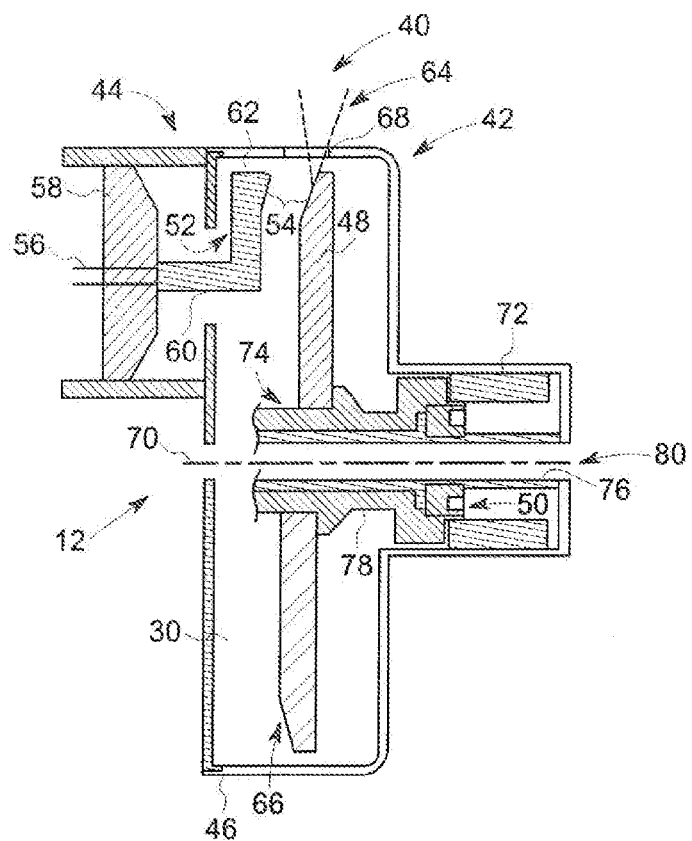
FIG. 2 is a cross-sectional view of a portion of an x-ray tube according to an exemplary embodiment of the invention and usable with the system illustrated in FIG. 1.

FIG. 2 illustrates a cross-sectional view of an x-ray source 12 incorporating embodiments of the invention. In the illustrated embodiment, x-ray source 12 is formed of an x-ray tube 40 that includes an anode assembly 42 and a cathode assembly 44. X-ray tube 40 is supported by the anode assembly 42 and cathode assembly 44 within an envelope or frame 46, which houses a target or anode 48, a bearing assembly 50, and a cathode 52. Frame 46 defines an area of relatively low pressure (e.g., a vacuum) 30 compared to ambient, in which high voltages may be present. Frame 46 may be positioned within a easing (not shown) filled with a cooling medium, such as oil, that may also provide high voltage insulation. While the target or anode 48 are described above as being a common component of x-ray tube 40, the tar or anode 48 may be separate components in alternative x-ray tube embodiments.

In operation, an electron beam 54 is produced by cathode assembly 44. In particular, cathode 52 receives one or more electrical signals via a series of electrical leads 56. The electrical signals may be timing/control signals that cause cathode 52 to emit electron beam 54 at one or more energies and at one or more frequencies. The electrical signals may also at least partially control the potential between cathode 52 and anode 48. Cathode 52 includes a central insulating shell 58 from which a mask 60 extends. Mask 60 encloses electrical leads 56, which extend to a cathode cup 62 mounted at the end of mask 60. In some embodiments, cathode cup 62 serves as an electrostatic lens that focuses electrons emitted from a thermionic filament within cathode cup 62 to form electron beam 54.

X-rays 64 are produced when high-speed electrons of electron beam 54 are suddenly decelerated when directed from the cathode 52 to a target or anode 48 or focal surface 66 formed on target or anode 48 via a potential difference therebetween of, for example, sixty (60) thousand volts or more in the case of CT applications. The x-rays 64 are emitted through a radiation emission passage 68 formed in frame 46 toward a detector assembly, such as detector assembly 18 of FIG. 1.

Anode assembly 42 includes a rotor 72 and a stator (not shown) located outside x-ray tube 40 and partially surrounding rotor 72 for causing rotation of anode 48 during operation. Target 48 is supported in rotation by a bearing assembly 50, which, when rotated, also causes target 48 to rotate about the centerline 70. As shown, target 48 has, a generally annular shape, such as a disk, and an annular opening 74 in the center thereof for receiving bearing assembly 50.

Target 48 may be manufactured to include a number of metals or composites, such as tungsten, molybdenum, or any material that contributes to Bennsstrahlung (i.e., deceleration radiation) when bombarded with electrons. Target 48 or focal surface 66 of target 48 may be selected to have a relatively high refractory value so as to withstand the heat generated by electrons impacting target 48. Further, the space between cathode assembly 44 and target 48 may be evacuated, in order to minimize electron collisions with other atoms and to maximize electric potential.

To avoid overheating of the target 48 when bombarded by the electrons, rotor 72 rotates target 48 at a high rate of speed (e.g., 90 to 250 Hz) about a centerline 70. In addition to the rotation of target 48 within frame 46, in a CT application, the x-ray tube 40 as a whole is caused to rotate about an object, such as object 16 of x-ray imaging system 10 in FIG. 1, at rates of typically 1 Hz or faster.

Bearing assembly 50 can be formed as necessary, such with a number of suitable ball bearings (not shown), but in the illustrated exemplary embodiment comprises a liquid lubricated or self-acting, bearing having adequate load-bearing capability and acceptable acoustic noise levels for operation within x-ray imaging system 10 of FIG. 1. As used herein, the terms "self-acting" and "self-lubricating" mean that the bearing lubricant remains distributed on the surfaces of the bearing due to the relative motion of the bearing components and absent an external pump.

In general, bearing assembly 50 includes a stationary portion, such as center shaft 76, and a rotating portion, such as shell 78 to which the target 48 is attached. While center shaft 76 is described with respect to FIG. 2 as the stationary portion of bearing assembly 50 and shell 78 is described as the rotating portion of bearing assembly 50, embodiments of the present invention are also applicable to embodiments wherein center shaft 76 is a rotary shaft and shell 78 is a stationary component. In such a configuration, target 48 would rotate as center shaft 76 rotates.

Center shaft 76 may optionally include a cavity or coolant flow path 80 though which a coolant 82 (FIG. 3), such as oil, may flow to cool bearing assembly 50. As such, coolant 82 enables heat generated from target 48 of x-ray tube 40 (FIG. 2) to be extracted therefrom and transferred external to x-ray tube 40. In straddle mounted x-ray tube configurations, coolant flow path 80 extends along a longitudinal length of x-ray tube 40. In alternative embodiments, coolant flow path 80 may extend through only a portion of x-ray tube 40, such as in configurations where x-ray tube 40 is cantilevered when placed in an x-ray imaging system 10.

Figure 3:
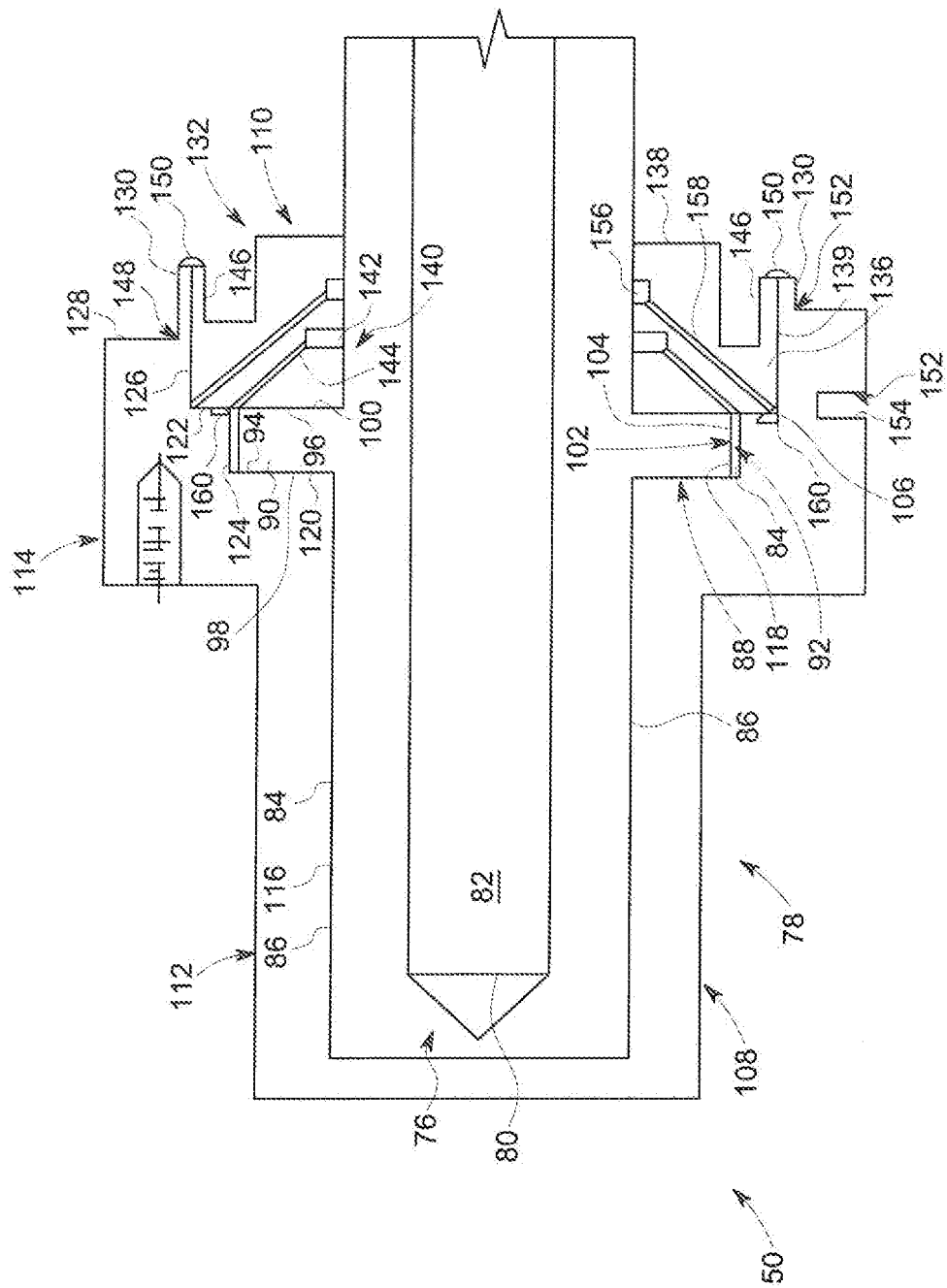
FIG. 3 is a cross-sectional side plan view of a bearing structure of an x-ray tube in accordance with an exemplary embodiment of the invention.

Referring now to FIG. 3, a cross-sectional view of a portion of bearing assembly 50 is shown according to an embodiment of the invention. Bearing assembly 50 includes a center shaft 76 positioned within shell 78, which is configured to support an anode (not shown), such as target 48 of FIG. 2. A lubricant 84 is positioned in a gap 86 formed between center shaft 76 and shell 78. In embodiments of the invention, lubricant 84 is a metal or metallic alloy that exists in a liquid state at operating temperature of bearing assembly 50.

The lubricating fluid 84 flowing between the rotating and stationary components of the bearing assembly 50 may include a variety of individual fluids as well as mixtures of fluids. For example, multiple liquid metals and liquid metal alloys may be used as the lubricating fluid, such as an indium gallium alloy. More generally, fluids with relatively low vapor pressures that are resistant to evaporation in vacuum-level pressures of the x-ray tube may be used. In the present context, low vapor pressures may generally be in the range of $1 \times 10^{-5}$ Torr. In other words, fluids that are stable in vacuums are desirable for use in x-ray tube systems so as to not adversely affect the established vacuum during operation of the system. In the present disclosure, lubricant 84 may be gallium or a gallium alloy as non-limiting examples.

In the embodiment illustrated in FIG. 3, center shaft 76 of bearing assembly 50 is a stationary component and shell 78 is a rotatable component constructed to rotate about center shaft 76. However, one skilled in the art will recognize the inventive concepts described herein are applicable to alternative bearing configurations. As one example, bearing assembly 50 may instead include a stationary outer component and a rotating center shaft comprising a target attached thereto. As another example, bearing assembly 50 may be a "straddle" bearing that is configured to support a target between a first and a second liquid metal bearing. In other words, embodiments of this invention may be incorporated into any bearing configuration utilizing a liquid lubricated bearing to support an anode or target. Such configurations may include a stationary center shaft and a rotatable outer shaft, and vice versa. Further, one skilled in the art will recognize that such applications need not be limited to x-ray tubes, but may be applied to any configuration having a rotating component in a vacuum, the rotating component being supported by a liquid lubricated bearing. Thus, the embodiments of the invention disclosed herein are applicable to any bearing configuration having a rotatable component and a stationary component, and a liquid lubricant therebetween, regardless of configuration or application.

As illustrated in FIG. 3, center shaft 76 of bearing assembly 50 includes a thrust bearing portion 88 comprising a radial projection 90 that extends from center shaft 76 and is positioned in a radial cavity 92 of shell 78. Radial projection 90 of thrust bearing portion 88 includes a pair of outer race surfaces 94, 96 that face inner race surfaces 98, 100 of shell 78. Radial projection 90 limits axial motion of shell 78 relative to center shaft 76, and, as illustrated, lubricant 84 is also included between radial projection 90 and shell 78. Radial projection 90 need not be limited in axial length, but may be extended in axial length to provide additional mechanical support of components.

A radial or journal bearing portion 102 of bearing assembly 50 is located adjacent thrust bearing portion 88. An outer surface 104 of journal bearing portion 102 of center shaft 76 faces an inner surface 106 of journal bearing portion 102 of shell 78. While journal bearing portion 102 is illustrated on a first side of thrust bearing portion 88 adjacent outer race surface 94, one skilled in the art will recognize that bearing assembly 50 may include a second journal bearing portion located on a second side of thrust bearing portion 88 adjacent outer race surface 96. Various coatings, textures, and patterns including grooves embedded in the contacting surfaces of bearing assembly 50 may be applied to alter bearing behavior as the center shaft 76 and shell 78 rotate relative to each other.

Bearing assembly 50 may be referred to as a spiral groove bearing (SGB) due to the patterning of grooves along the various surfaces of the bearing. In some examples, the spiral groove may be formed from a logarithmic spiral shape. The spiral groove bearing may also be equivalently referred to as a fluid dynamic bearing and liquid bearing as well. In such spiral groove bearings, ways to contain the liquid lubricant 84 may be categorized in two general methods. The first includes providing physical barriers near the ends of the bearing where shaft seals would be placed in other applications. Rubber or other types of shaft seals in the presence of the vacuum' inside the x-ray tube 40 may function improperly, degrade quickly, and/or destroy the pressure inside the x-ray tube 40. For similar reasons, a-rings, grease, or other conventional means for aiding in rotational lubrication between two components may be undesirable because of the vacuum in the x-ray tube 40. Greases and other lubricants with lower vapor pressure than liquid metals may vaporize and destroy the vacuum. In some examples, physical walls of different shapes and sizes may be placed at different angles to capture the lubricant to reduce leakage through the bearing.

The second general method includes utilizing the capillary forces of the lubricant, wherein the small gap between two opposing bearing surfaces wets the fluid to retain the fluid within the gap. In other words, the anti-wetting properties of the surface (via texturing, coating, or both) aids in preventing the lubricant from flowing in between the small gaps. In some examples, the surfaces are coated and/or textured to be more wetted such that the lubricant clings in the small gap to reduce lubricant moving through the gap. In other examples, the surfaces are coated and/or textured to be more anti-wetting such that the lubricant is pushed away from the small gaps near the ends of the bearing assembly. In this context, the small gap may be in the range of 30-120 microns.

Operation of liquid bearings in x-ray tube systems, such as bearing assembly 50 of FIGS. 2 and 3, may be at least partially dependent on a tradeoff between load carrying capacity and fluid pumping force. In some examples, the load carrying capacity and fluid pumping force are inversely proportional and directly related to geometry of the bearing grooves. For example, given a substantially constant rotational speed of the liquid bearing, deeper grooves may provide a higher pumping force, while the increased clearance between the shaft and sleeve can reduce the load carrying ability of the bearing. Pumping force may be utilized to contain the lubrication fluid and anti-wetting coatings may be applied to sealing surfaces to further assist in containing the lubrication fluid.

The lubricating fluid in between bearing surfaces such as the shaft and sleeve are rotating relative to each other. As such, the lubricating fluid is moved in a number of ways, including but not limited to, shearing, wedging, and squeezing, thereby creating pressures to lift and separate the shaft and sleeve from each other. This effect enables the liquid bearing to function and provide low-friction movement between the shaft and sleeve. In other words, shearing of the lubricating fluid imparts energy into the fluid which cases the fluid to pump, wherein the pumping action into the gap between the shaft and sleeve is how the liquid bearing functions. Energy transfer from the surfaces to the fluid enables bearing functionality. In application, in the context of the x-ray tube, wetting between some bearing surfaces and the lubricating fluid allows shearing to impact energy to the fluid.

Figure 6:
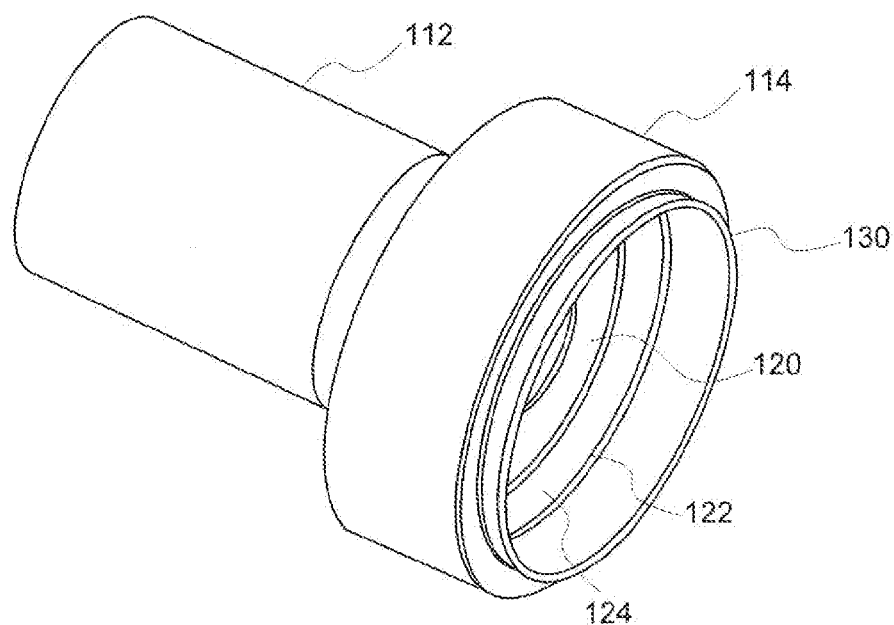
FIG. 6 is an isometric view of a bearing sleeve for the bearing structure of FIG. 3 in accordance with an exemplary embodiment of the invention.
Figure 7:
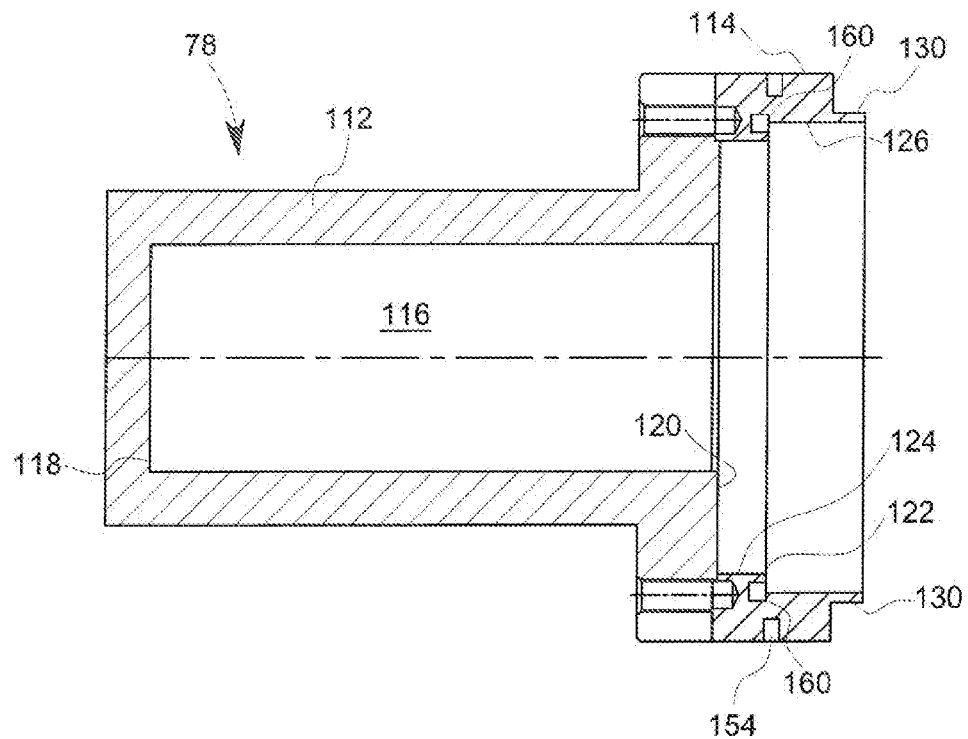
FIG. 7 is a cross-sectional view of the bearing sleeve of FIG. 6.

In the exemplary embodiment of the invention illustrated in FIG. 3 the shell 78 is formed with a 2-piece construction including a sleeve 108 and a thrust seal 110. In the exemplary construction of the sleeve 108 shown in FIGS. 3, 6 and 7, the sleeve 108 is formed of a material that is low cost, with good machinability, good galling/wear characteristics, and good weldability. Further, while these material do conduct heat, optionally a thermal barrier can be included between the bearing assembly 50 and the target 48 to maintain the temperatures in the bearing assembly 50 below the corrosion limits of the materials forming the bearing assembly 50. In an exemplary embodiment of the invention, the material forming the sleeve 108 is a non-refractory metal, such as an iron alloy, including stainless steel or tool carbon steel, among others. The sleeve 108 is formed as a single piece of the selected material, with a closed cylindrical cap portion 112 at one end and an open seating portion 114 at the opposite end. The seating portion 114 is integrally formed with the cap portion 112 to form a unitary structure for the sleeve 108, and has a diameter greater than that of the cap portion 112, such that the seating portion 114 extends radially outwardly from the cap portion 112.

The cap portion 112 and seating portion 114 define a channel 116 therein within which the center shaft 76 is disposed. The cap portion 112 includes a circumferential recess 118 disposed opposite the seating portion 114 to retain an amount of the lubricant 84 therein in order to maintain a minimum amount of the lubricant 84 in the gap 86 defined between the cap portion 112 and the center shaft 76.

The seating portion 114 includes a first shoulder 120 generally opposite the circumferential recess 118 and a second shoulder 122 axially spaced from the first shoulder 120 in a direction away from the circumferential recess 118 by a first surface 124. The radial distance of the first shoulder 120 defines the inner race surface 98 on the seating portion 114, while the first surface 124 corresponds to the axial length of the radial projection 90 on the center shaft 76. Thus, when the center shaft 76 is positioned within the sleeve 108, the end of the center shaft 76 located adjacent the circumferential recess 118 and the radial projection 90 are each appropriately spaced from the closed end of the cap portion 112 and the first shoulder 120 and first surface 124 of the seating portion 114, respectively by the 86 in which the lubricant 84 is positioned.

The seating portion 114 also includes a second surface 126 extending axially outwardly from the second shoulder 122. In conjunction with a reduced diameter section 128 of the seating portion 114 positioned opposite the cap portion 112, the second surface 126 defines a weld flange 130 opposite the second shoulder 122.

Figure 4:
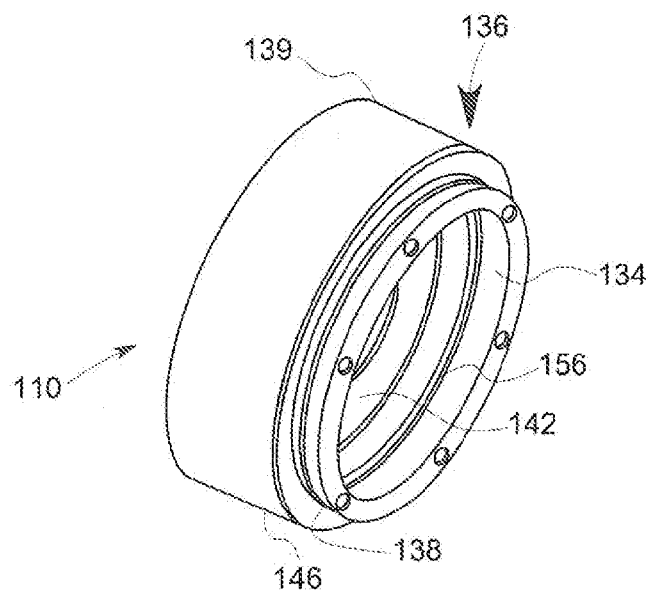
FIG. 4 is an isometric view of a thrust seal for the bearing structure of FIG. 3 in accordance with an exemplary embodiment of the invention.
Figure 5:
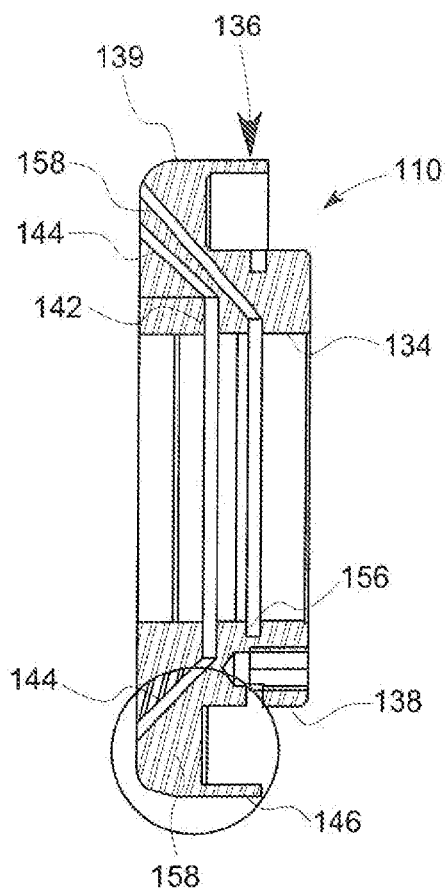
FIG. 5 is a cross-sectional view of the thrust seal of FIG. 4 in accordance with an exemplary embodiment of the invention.

An exemplary embodiment of the thrust seal 110 is shown in FIGS. 3-5. The thrust seal 110 includes a body 132 that is formed of a material the same as or similar to that used for the sleeve 108 and is generally ring-shaped with a central aperture 134 formed therein that corresponds in shape to the channel 116 defined by the cap portion 112 of the sleeve 108. The body 132 includes an inner section 136 that is positioned in engagement within the seating portion 114 of the sleeve 108 and a reduced diameter outer section 138 integrally formed with the inner section 136. The inner section 136 has a diameter slightly less than that of the seating portion 114 to enable the inner section 136 of the thrust seal 110 to seat within the radius of the seating portion 114 defined by the second surface 126. The outer peripheral edge 139 of the inner section 136 opposite the outer section 138 is rounded and/or chamfered in order to facilitate the insertion of the inner section 136 within the seating portion 114. In addition, the proper positioning of the inner section 136 of the thrust seal 110 relative to the seating portion 114 of the sleeve 108 is achieved by the second shoulder 122 which functions as a stop for the placement of the inner section 136 within the seating section 114. When positioned against the second shoulder 122, the inner section 136 maintains the gap 86 between the inner section 136 and the outer race surface 96 on the radial projection 90, such that the inner section 136 forms the inner race surface 100.

Referring to the exemplary embodiment of FIG. 3, the inner section 136 also includes one or more bearing fluid traps 140 formed in fluid communication with the central aperture 134. The bearing fluid trap 140 include a notch 142 formed in the inner section 136 adjacent and in fluid communication with the central aperture 134 and one or more pathways or tubes 144 extending from the notch 142 to intersect the gap 86 between the inner race surface 100 formed by the inner section 136 and the outer race surface 96 of the radial projection 90. With the bearing fluid trap 140, when any liquid metal bearing lubricant 84 flows around the radial projection 90 into the gap 86 defined between the center shaft 76 and the central aperture 134 of the thrust seal 110, the lubricant 84 will be directed by the centrifugal forces of the rotation of the bearing assembly 50 into the notch 142 to flow along the tube(s) 144 and back towards the radial projection 90. In addition, the surface of the central aperture 134 located between the inner race surface 100 and the notch 142 can be coated with an anti-wetting, coating in order to minimize any amounts of liquid metal bearing lubricant 84 reaching the bearing fluid trap 140.

The inner section 136 also includes a weld flange 146 that extends axially outwardly from the outer peripheral edge 139 of the inner section 136 to partially overlap the outer section 138. The weld flange 146 is dimensioned to be coextensive with the weld flange 130 formed on the seating portion 114 when the thrust seal 110 is seated within the seating portion 114.

To position the thrust seal 110 within the seating portion 114, in an exemplary embodiment of a method of assembling the bearing assembly 50, initially an amount of the lubricant or liquid metal bearing fluid 84 is placed within the channel 116 of the sleeve 108. The center shaft 76 is subsequently inserted into the channel 116 to position the radial projection 90 against the first shoulder 120, with the lubricant 84 positioned between the sleeve 108 and the center shaft 76 forming the gap 86. The thrust seal 110 is then shrink fit into the seating, portion 114 of the sleeve 108 to maintain the coaxiality required by the rotating liquid metal seal about the center shaft 76 and to hold the sleeve 108 and thrust seal 110 in place relative to one another fir subsequent joining to each other. The shrink fit step can be done as part of the build process for the bearing assembly 50. In this step, the thrust seal 110 is moved away from a heating zone of the build heating elements (not shown) that is positioned around the sleeve 108 in order to keep the thrust seal 110 cold, while the sleeve 108 is heated by the heating elements and expands diametrically on the order of 160 µm as it is heated, to a gallium wetting temperature of approximately 200 to 500° C. The thrust seal 110 is then lowered into the seating portion 114 and allowed the heating element is removed/turned off, such that the sleeve 108 is allowed to cool. As the sleeve 108 cools, the seating portion 114 contracts around and into engagement with the inner section 136 of the thrust seal 110, thereby securing the thrust seal 110 within the seating portion 114.

To minimize and deformation of the critical bearing forms of the bearing assembly 50, such as the cylindricity of the sleeve 108 and thrust seal 110, or the various surfaces forming of the shell 78 used in forming the gap 86 around the center shaft 76 and radial projection 90 during the shrink fit steps, the geometry of the localized shrink fit zone 148 and any necessary surrounding areas of the seating portion 114 and thrust seal 110 would be formed to accommodate for any deformation caused by the shrink fit process.

Once the thrust seal 110 is properly seated within the seating portion 114, such as by using the shrink fit process or by clamping the thrust seal 110 relative to the seating portion 114, the weld flanges or features 130, 146 are positioned adjacent and in alignment with one another. In this position, due to the materials used to form the sleeve 108 and the thrust seal 110, the weld flanges 130,146 can be welded to one another to secure the thrust seal 110 in position relative to the sleeve 108. The weld 150 formed across the weld flanges 130,146 effectively seals off the leak pathway between the second surface 126 of the seating portion 114 and the outer edge 139 of the inner portion 136.

In addition, the heat applied to the weld flanges 130,146 to form the weld 150 in any suitable manner, such as in atmosphere or under vacuum, can also cause deformation of certain areas of shrink fit zone 148 and surrounding areas of the sleeve 108 and the thrust seal 110. However, as the shrink fit process expands the sleeve 108, while the subsequent formation of the weld 150 contracts the sleeve 108, these deformation effects can roughly balance one another, resulting in no significant deformation of the bearing assembly 50.

To further address any deformities that may occur in the shrink fit and/or welding steps, it is possible to localize the deformation to particular areas of the sleeve 108 and thrust seal 110 and away from important bearing surfaces within the bearing assembly 50. In order to accomplish this, the sleeve 108 and thrust seal 110 can be formed with certain deformation restriction features 152 that provide sacrificial deformation aspects to the structure of the sleeve 108 and/or thrust seal 110 restrict and localize the deformation caused by the shrink fit and welding processes These deformation restriction features 152 can include the weld flanges 130, 146, which can be varied in thickness and/or length, as necessary to provide this function, or grooves, bores or notches 154 formed in the seating, portion 114 adjacent the weld flange 130, among other various potential deformation restriction features 152 present on the sleeve 108 and/or thrust seal 110. These deformation restriction, features 152 can also be localized on or circumferentially extending around the sleeve 108 and/or thrust seal 110.

With regard to the welding step, in one exemplary embodiment this is performed by laser welding due to the minimized heating effects that reduce the potential deformation of the sleeve 108 and thrust seal 110 and limit the likelihood of gallium corrosion of the materials, e.g., the metals, forming the sleeve 10 and thrust seal 110. During the weld operation, if performed in a non-vacuum atmosphere, gases can be trapped within the bearing structure assembly 50. When the bearing assembly 50 with these trapped gases is placed in vacuum for operation, the gases will be drawn out of the assembly 50 through the central aperture 134 of the thrust seal 110, either along the gap 86 or through the tube 144 for the bearing fluid trap 140. Along either path, the gases will draw out an amount of the liquid metal bearing lubricant 84 along with the gases. To prevent this loss or leak of the lubricant 84, as shown in the exemplary embodiment of FIG. 3, a vent tube 156 funned similarly to rube 144 is formed in the thrust seal 110 to extend from a notch 158 adjacent and in fluid communication with the central aperture 134 to the outer peripheral edge 139 of the inner section 136 of the thrust seal 110. With this vent tube 156, the gases trapped in the bearing assembly 50 after welding would be drawn along the vent tube 156 to the notch 158 and out of the hearing assembly 50 without contacting the lubricant 84 positioned within the gap 86 or along the path from the gap 86 to the bearing fluid trap 140, thereby minimizing any losses of the lubricant 84 due to the venting gases. To further assist in maintaining the lubricant 84 within the bearing assembly 50, an anti-wetting coating can be applied to the surface of the inner section 136 between the tube 144 and the vent tube 156. This anti-wetting coating can additionally be applied to the surface of the central aperture 134 between the trap notch 142 and the vent notch 158, as well as between the vent notch 158 and the end of the central aperture 134 opposite the inner section 136 to further minimize the potential for leaks of the liquid metal bearing lubricant 84 through the central aperture 134.

The ability of the vent tube 156, along with the bearing fluid trap 140 shown in the exemplary embodiment of the invention in FIG. 3, to minimize the loss of any lubricant 84 from within the bearing assembly 50 is important to enable the bearing assembly 50 to operate with a minimum amount of lubricant 84, thereby maximizing the efficiency of the bearing assembly 50. To assist in this, the seating portion 114 of the sleeve 108 is formed with one or more radial slots 160 located adjacent the end of the trap tube 144 opposite the notch 142. The radial slots 160 are formed in the second shoulder 122 in a manner that does not interfere with the proper seating of the inner section 136 of the thrust seal 110 on the second shoulder 122, but that provides a small reservoir for any excess lubricant 84 placed within the sleeve 108. If any excess lubricant 84 is present, when the bearing assembly 50 is operated the centrifugal threes will direct the excess lubricant 84 out of the gap 86 between the radial projection 90 and the inner race surface 100 and radially outwardly into the radial slots 160. This also can minimize the amount of lubricant 84 entering the bearing fluid trap 140 as the lubricant 84 is first directed into the radial slots 160 rattier than towards the bearing fluid trap 140 due to the centrifugal forces acting on the lubricant 84. Additionally, if there are any losses of liquid metal bearing lubricant 84 during operation, any amount of the lubricant 84 in the radial slots 160 can replenish the losses by flowing hack into the gap 86 in the cap portion 112 of the sleeve 108 when the bearing assembly 50 is not in operation.

Additionally, due to the elimination of the compression seals and associated components for the compression seals, the bearing assembly 50 has a significant reduction in the overall outer diameter of the bearing assembly 50 compared to prior art bearing assemblies. As a result the bearing assembly 50 can be utilized in x-ray tubes of smaller sizes without having to alter the configuration of the bearing assembly 50.

The written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed:

1. A bearing assembly comprising:
   a. a sleeve comprising a first welding feature thereon;
   b. a shaft rotatably disposed within the sleeve;
   c. a thrust seal seated at least partially within the sleeve; the thrust seal comprising: a central aperture through which the shaft extends, and a second welding feature formed on, spaced from the central aperture and extending outwardly from the thrust seal; and
   d. a weld joining the first welding feature and the second welding feature to one another.

2. The bearing assembly of claim 1, wherein the sleeve and the thrust seal are each formed of a non-refractory metal.

3. The bearing assembly of claim 2, wherein the non-refractory metal is selected from a stainless steel or a carbon tool steel.

4. A bearing assembly comprising:
   a. a sleeve comprising a first welding feature thereon;
   b. a shaft rotatably disposed within the sleeve;
   c. a thrust seal seated at least partially within the sleeve, the thrust seal comprising: a central aperture through which the shaft extends, and a second welding feature thereon; and
   a weld joining the first welding feature and the second welding feature to one another, wherein at least one of the sleeve or the thrust seal includes at least one weld deformation restriction feature.

5. The bearing assembly of claim 4, wherein the at least one weld deformation restriction feature is selected from the first welding feature, the second welding feature, or a combination thereof.

6. A bearing assembly comprising:
   a. a sleeve comprising a first welding feature thereon;
   b. a shaft rotatably disposed within the sleeve;
   c. a thrust seal seated at least partially within the sleeve, the thrust seal comprising: a central aperture through which the shaft extends, and a second welding feature thereon; and
   a weld joining the first welding feature and the second welding feature to one another, wherein the sleeve includes a cap portion forming a closed end of the sleeve and a seating portion forming an open end of the sleeve.

7. The bearing assembly of claim 6, wherein the cap portion and the seating portion are integrally formed with one another as a unitary structure.

8. The bearing assembly of claim 6, wherein the seating portion defines a first shoulder that receives a radial projection on the shaft and a second shoulder axially spaced from the first shoulder that receives the thrust seal.

9. The bearing assembly of claim 8, wherein the seating portion includes a liquid metal bearing fluid reservoir slot adjacent the second shoulder.

10. The bearing assembly of claim 6, wherein the thrust seal is frictionally engaged with the seating portion by a shrink fit.

11. A bearing assembly comprising:
    a. a sleeve comprising a first welding feature thereon;
    b. a shaft rotatably disposed within the sleeve;
    c. a thrust seal seated at least partially within the sleeve, the thrust seal comprising a central aperture through which the shaft extends, and a second welding feature thereon; and
    a weld joining the first welding feature and the second welding feature to one another, wherein the thrust seal includes a vent tube extending through the thrust seal between the central aperture and an outer edge of the thrust seal.

12. The bearing assembly of claim 11, wherein the thrust seal comprises a trap tube formed in the thrust seal and extending through the thrust seal between the central aperture and an outer edge of the thrust seal at a location spaced from the vent tube.

13. A method for forming a bearing assembly for use in an x-ray tube, the method comprising the steps of:
    a) providing a sleeve formed of a non-refractory material and comprising a cap portion forming a closed end of the sleeve and a seating portion joined to the cap portion and forming an open end of the sleeve;
    b) inserting a shaft into the cap portion of the sleeve;
    c) securing a thrust seal in the seating portion of the sleeve around the shaft; and
    d) welding the seating portion of the sleeve and the thrust seal to one another.

14. The method of claim 13, wherein the step of securing the thrust seal in the seating portion of the sleeve comprises shrink fitting the seating portion of the sleeve around the thrust seal.

15. The method of claim 14, wherein the shrink fitting step comprises:
   a) heating the sleeve and the shaft;
   b) placing the thrust seal around the shaft and within the seating portion of the sleeve; and
   c) cooling the sleeve and the shaft to engage the sleeve with the thrust seal.

16. The method of claim 13, wherein the step of welding the seating portion of the sleeve and the thrust seal to one another comprises:
   a) forming a weld between a pair of weld flanges disposed on the seating portion and the thrust seal; and
   b) venting gases trapped in the bearing assembly through a vent tube formed in the thrust seal.

17. The method of claim 13, further comprising the step of placing an amount of a liquid metal bearing fluid into the cap portion of the sleeve.

18. An x-ray tube comprising:
   a) a frame defining an enclosure;
   b) a cathode assembly disposed in the enclosure; and
   c) an anode assembly disposed in the enclosure spaced from the cathode assembly, wherein the anode assembly comprises:
      i. a sleeve formed of a first material and comprising: a first welding feature thereon;
      ii. a shaft rotatably disposed within the sleeve;
      iii. a thrust seal seated at least partially within the sleeve, the thrust seal comprising a central aperture through which the shaft extends and a second welding feature thereon; and
      iv. a weld joining the first welding feature and the second welding feature to one another; and
      v. an anode target operably connected to the sleeve.

19. The x-ray tube of claim 18, wherein the sleeve and the thrust seal are formed of a weldable, non-refractory material.

20. The x-ray tube of claim 18, wherein the sleeve and the thrust seal include at least one deformation restriction feature.

* * * * *